United States Patent [19]

Crnojevich et al.

[11] Patent Number: 5,171,547

[45] Date of Patent: * Dec. 15, 1992

[54] RECOVERY OF CHROMIUM IN HIGH PURITY STATE FROM WASTE MATERIALS OF ETCHING OPERATIONS

[75] Inventors: Ranko Crnojevich, New Orleans; Andrew B. Case, Harvey; Felix D. Rando, Marrero; John D. Sweeney, Chalmette, all of La.

[73] Assignee: Amax, Inc., New York, N.Y.

[*] Notice: The portion of the term of this patent subsequent to Sep. 4, 2007 has been disclaimed.

[21] Appl. No.: 585,648

[22] Filed: Sep. 19, 1990

[51] Int. Cl.$^5$ .......................... C22B 3/00; C01G 37/00
[52] U.S. Cl. ........................ 423/55; 423/54; 423/53; 423/57; 423/127; 423/132; 423/DIG. 2
[58] Field of Search ............... 423/53, 54, 55, 57, 423/58, 127, 132, DIG. 2; 210/702

[56] References Cited

U.S. PATENT DOCUMENTS

| | | | |
|---|---|---|---|
| 4,207,295 | 6/1980 | Kagetsu et al. | 423/55 |
| 4,668,483 | 5/1987 | Ladd et al. | 423/53 |
| 4,798,708 | 1/1989 | Ladd et al. | 423/54 |
| 4,954,168 | 9/1990 | Crnojevich et al. | 423/53 |

FOREIGN PATENT DOCUMENTS 1467298 8/1969 Fed. Rep. of Germany ........ 423/53

Primary Examiner—Theodore Morris
Assistant Examiner—Edward Squillante
Attorney, Agent, or Firm—Hopgood, Calimafde, Kalil, Blaustein & Judlowe

[57] ABSTRACT

The present invention is directed to a method for treating a sludge containing substantial amounts of chromium, aluminum, calcium, iron, and phosphorous. The method comprises forming a slurry of the sludge; reacting the slurry with an acid to dissolve substantially all the aluminum and chromium and provide a solids residue comprising mostly calcium sulfate; separating the chromium/aluminum-containing solution from the solids residue; raising the pH of the chromium-/aluminum solution to precipitate chromium as chromium hydroxide; and separating the chromium hydroxide from the remaining aluminum-containing solution. The chromium hydroxide is then enriched with an alkali or earth alkali compound and calcined in an oxidizing atmosphere to convert the chromium to a chromate. The calcine is leached in an aqueous medium at a controlled pH to yield a high concentration, high purity chromate solution suitable for producing metallic chromium or a variety of chromium chemicals.

30 Claims, 1 Drawing Sheet

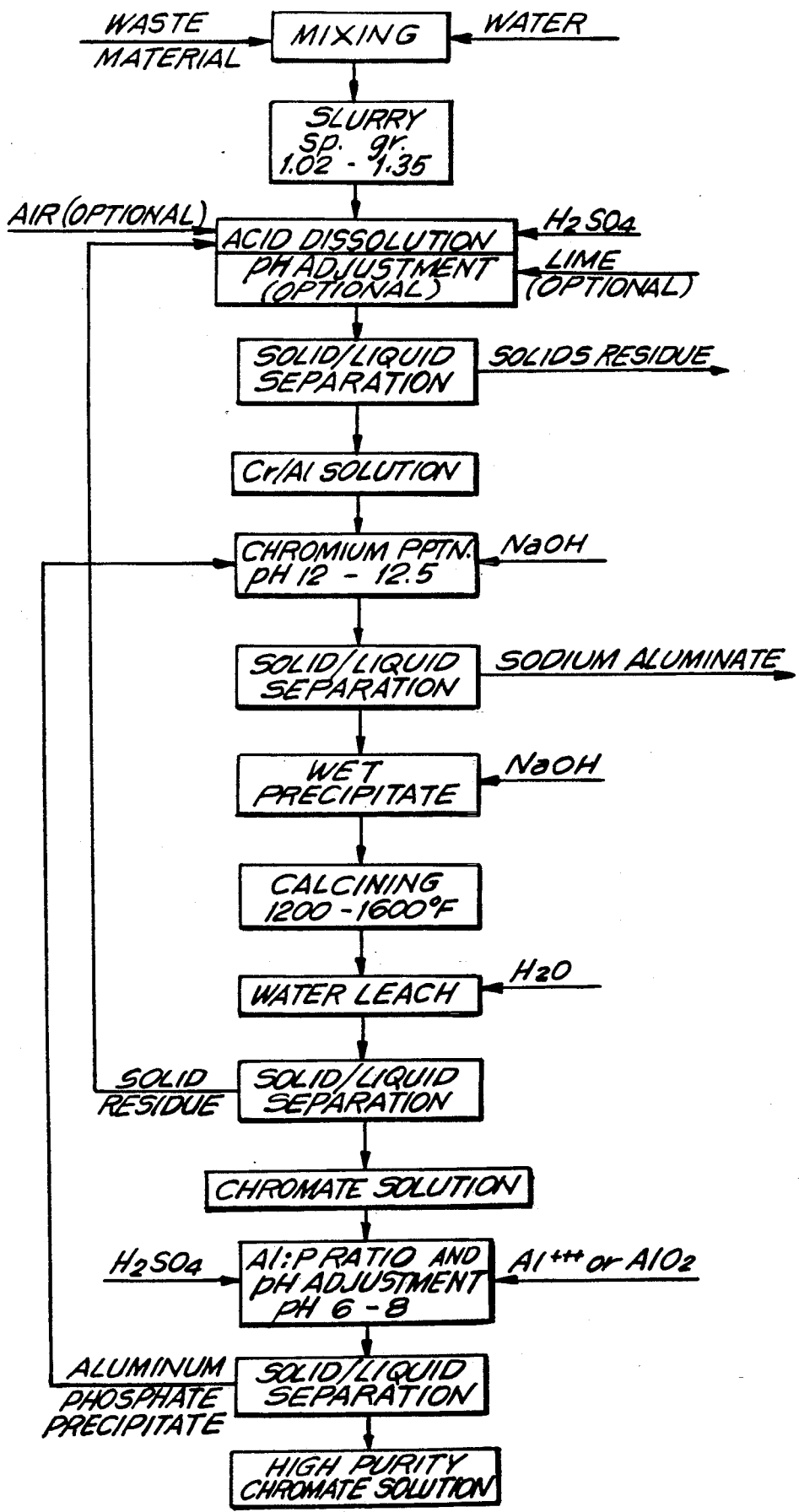

RECOVERY OF CHROMIUM IN HIGH PURITY STATE FROM WASTE MATERIALS OF ETCHING OPERATIONS

The present invention relates to the recovery of chromium, and optionally aluminum, in a high purity form from waste material such as that produced in etchant operations. The invention also provides a method for reducing the toxicity of the waste material, thereby easing its disposal.

BACKGROUND OF THE INVENTION

Manufacturers of finished aluminum products, such as sheets, rods, windows, doors, etc., use etchant solutions for surface passivation, or for preparing a surface to receive a coating of paint or other coating material. Chromic acid may be used alone as the etchant solution or, more commonly, used with phosphoric acid or other additives, such as zinc, molybdenum, HF, or $HNO_3$. The spent etchant solutions are typically treated for chromium removal by acidifying the solution to a pH 2 to 4 and reducing the chromium from $Cr(+6)$ to $Cr(+3)$ with sodium bisulfite or another chemical reductant or by electrolytical reduction. The $Cr(+3)$ is then precipitated as chromium hydroxide by adjusting the pH of the solution to about 6 or above with NaOH, KOH, MgO, CaO or combinations thereof. The precipitated chromium hydroxide is then recovered by settling and decantation, centrifugation, and/or filtration. The resulting chromium-containing material is typically produced as a wet filter cake (50-75% moisture). The waste may also be produced in the form of solutions, sludges, slurries, dried solids, and the like. The waste contains predominantly chromium, aluminum, calcium and phosphates and minor amounts of iron, zinc, magnesium, fluorides, sodium, potassium, etc.

This waste material is designated as a hazardous waste under code FO19 by the U.S. Environmental Protection Agency (EPA), mainly because of its chromium content, and its disposal is regulated by federal, state, county, and city ordinances. In the past, the sludge was typically disposed in landfills after dewatering. However, this practice is coming under greater scrutiny by the regulating authorities, primarily due to the presence of the chromium hydroxide which is water leachable under mild acidic conditions. To prevent any leaching of the metal hydroxide, secure and chemically maintained land disposal sites are required. Additionally, regulations may require that the chromium be immobilized or fixated before landfilling. Thus, the disposal costs associated with chromium-containing wastes are high and are continually increasing. The disposer also remains liable for the waste material as long as it can be traced. These and other factors add to the incentives to find safe and economical means for disposal of the waste.

Accordingly, it is advantageous from an environmental and economic standpoint to reduce the chromium content of the material prior to disposal and recover the chromium in a marketable form. In U.S. Pat. No. 4,954,168, a method is disclosed for the recovery of chromium from waste material as synthetic chromium oxide concentrate. But the marketability of this concentrate is somewhat limited due to one or more objectionable impurities. For example, the phosphorous content of this concentrate is objectionable to producers of steel alloys, and the sodium content is objectionable to producers of refractory materials.

The purpose of this invention is to provide a method for recovering chromium, and optionally aluminum, from waste material as useful products of commerce, while reducing the toxicity of the waste to facilitate its disposal. Of great significance, the present invention permits the recovery of chromium in a form which is sufficiently pure to be usable in a broad number of applications.

SUMMARY OF THE INVENTION

The present invention is directed to a method for treating a sludge containing substantial amounts of chromium, aluminum, calcium, iron, and phosphorous. The method comprises forming a slurry of the sludge; reacting the slurry with an acid to dissolve substantially all the aluminum and chromium, and provide a solids residue comprising mostly calcium sulfate, in addition to calcium fluoride, calcium silicate, iron compounds and other compounds; separating the chromium-/aluminum-containing solution from the solids residue; raising the pH of the chromium/aluminum solution to precipitate chromium as chromium hydroxide; and separating the chromium hydroxide from the remaining aluminum-containing solution. The chromium hydroxide is then enriched with an alkali or earth alkali compound and calcined in an oxidizing atmosphere to convert the chromium to a chromate. The calcine is leached in an aqueous medium at a controlled pH to yield a high concentration, high purity chromate solution suitable for producing a variety of chromium chemicals or metallic chromium.

BRIEF DESCRIPTION OF THE FIGURE

FIG. 1 is a process flowsheet for producing high purity chromate solution from waste sludge in accordance with a preferred embodiment of the invention.

DETAILED DESCRIPTION OF THE INVENTION

The invention will now be described with reference to the embodiment shown in the flowsheet of FIG. 1. The embodiment shown, is a preferred method for the practice of the invention, but it is not intended to restrict the invention to the precise conditions or steps illustrated.

The present invention is useful for the treatment of any waste materials which contain chromium and, optionally, aluminum. The invention is particularly useful for the treatment of sludges produced in etching operations during the manufacture of aluminum products. These sludges contain substantial amounts of chromium, aluminum, iron, calcium, magnesium, and phosphorous, and other elements in minor quantities. A typical sludge composition prior to treatment may comprise by weight on an elemental and dry basis about 2.0% to 20% chromium, about 2% to 15% aluminum, 0.5 to 15% iron, 1 to about 12.0% phosphorous, 2 to about 25% calcium, 0.1 to about 1% magnesium, 0-1% zinc, 1-7% sulfur as sulfates and/or sulfites, 0-1% silicon and other elements like Mo, Ni, Cu in trace amounts. The sludge is first converted into a slurry by mixing with water. The mixing is preferably performed at a temperature from about ambient to about 210° F. and the resulting slurry has a specific gravity from about 1.02 to about 1.35. The slurry is then treated with acids to substantially dissolve metals of aluminum and chromium and produce a chromium/aluminum solution and a solids residue gangue material comprising $CaSO_4$, $CaF$, $CaSiO_4$, some iron compounds and other undissolved compounds. In FIG. 1, this step is indicated by the acid dissolution block. Dissolution is carried out under a relatively low to moderate pH, for example, about 0.1–3.0 and generally in the pH range of about 1.0–1.5, at ambient or elevated temperature, such as 70°–150° F.

Any acids which will cause aluminum and chromium to dissolve may be used in the practice of the invention, including $H_2SO_4$, $HCl$, $HNO_3$. Sulfuric acid is the most preferred and the most commonly used reagent mainly because of economic reasons but also because of processing advantages and convenience (lower corrosivity, absence of fumes, etc.).

As indicated in FIG. 1, air or another oxygen-containing gas or any other available mild oxidants may optionally be used during dissolution to oxidize part, or all, ferrous iron present in the slurry to the ferric state while maintaining chromium in the trivalent state.

Following the dissolution of aluminum and chromium, the pH of the chromium/aluminum solution may be adjusted or controlled (conveniently but not necessarily in the presence of the undissolved solids) to maintain a medium pH of about 1.2–3.5, preferably about 1.4–2.0, in order to precipitate some additional undesirable elements, for example iron, while limiting or avoiding the precipitation of chromium and aluminum. Although this step is preferred, it is not essential to the practice of the invention, and is shown on FIG. 1 as an optional portion to the acid dissolution block marked pH adjustment.

The pH can be adjusted or controlled by adding any available alkaline reagent, such as hydroxides or carbonates of sodium or potassium; or oxides, carbonates or hydroxides of calcium, magnesium, barium, aluminum or chromium. Lime or hydrated lime is the preferred reagent because of its availability and cost. Additionally, lime or hydrated lime makes the subsequent solid/liquid separation easier and more efficient by forming gypsum; particularly, if this separation is carried out by filtration methods and the dissolution step is carried out with sulfuric acid.

The reaction system is then subjected to solid/liquid separation (commonly by filters, centrifuges or decantation) to separate the chromium/aluminum solution from the solids residue. Recovery of aluminum and chromium in the purified solution is normally very substantial, being about 85 - 98%, or more commonly about 90–95%, of the total aluminum and chromium content of the waste material.

The amount and composition of the solids residue will depend on the initial composition of the waste material and the reagents used for dissolution and pH adjustment. For example, the use of calcium compounds in a sulfate medium, would be more economical than NaOH or KOH but the latter compounds enhance filterability of the reaction slurry, but increase the amount of residue. In general, the mass of the residue will be about 20–40% (on a dry basis) of the original sludge quantity, generally about 30% of the original quantity.

This residue can be disposed in a conventional manner, or preferably, after further processing, can be used for additional aluminum recovery, and transforming it to a non-hazardous waste. In one embodiment of the invention, the residue is further processed by dispersing it in water containing alkalies and aluminates and heating the material from about 300° F. to 450° F., preferably 400° F., at superatmospheric pressure ranging from about 70 to 300 psig. Such procedure fixes the chromium in a non-soluble form through formation of spinels or garnet type minerals and thus renders the residue material a non-hazardous waste as determined by the EPA toxicity test.

The chromium/aluminum solution is further tested to recover chromium and, optionally, aluminum. This may be achieved by pH precipitation of chromium at moderate to elevated temperatures. The pH precipitation is conducted in the 4.0–13.8 pH range. In one embodiment this is conveniently and economically achieved by raising the pH of the solution to a relatively high level, approximately pH 11.5–13.8, preferably a pH range of 12.0–12.5, by adding alkaline hydroxides (e.g. NaOH or KOH). The aluminum will remain in the solution as sodium aluminate while chromium is completely precipitated as chromium hydroxide. The chromium precipitation block in FIG. 1 illustrates this step with the use of NaOH at a pH of 12–12.5. The reaction is carried out at ambient or elevated temperatures, such as about 60°–210° F., preferably about 100°–150° F. Optionally, the pH precipitation may be conducted at a lower pH level, such as 4-8 pH, wherein aluminum will coprecipitate with chromium which may be advantageously exploited to control the phosphorous content in the final chromate product solution. A high alkalinity, i.e. pH 13-14, may also be employed to minimize the content of phosphorous and zinc in the final chromate solution.

The chromium hydroxide precipitate is separated from the sodium aluminate solution by filtration or centrifugation or other solid-liquid separation means. The unwashed wet precipitate is then mixed with alkalies or earth alkalies (such as NaOH, KOH, $Na_2CO_3$, CaO, $Ca(OH)_2$, or $CaCO_3$) to achieve an alkali to chromium molar ratio (expressed as "$Na_2O/Cr$") of about 1.0-2.0, preferably 1.2-1.5. The use of NaOH is shown in FIG. 1. The resulting admixture is calcined in an oxidizing atmosphere (such as air or oxygen) at a temperature of 1000°-2000° F., preferably 1200°-1600° F., to convert substantially all of the chromium into a chromate form.

The calcine admixture is then leached in water to produce a chromate solution which is isolated by solid/liquid separation means. Preferably, the aluminum:-phosphorous ratio in the isolated solution is adjusted to between 1:1 and 2:1 (if needed) and the pH is controlled close to neutral, e.g. around pH 6-8. The Al:P ratio may be adjusted by the addition of aluminum ions or an aluminum compound which will produce aluminum ions in solution, i.e. $AlO_2$ as illustrated in FIG. 1. In the embodiments where precipitation of chromium is conducted at a lower pH, i.e. 4-8 pH, the solution typically contains enough aluminum that addition of aluminum ions or compounds will not be necessary. The pH of the solution may be adjusted by the addition of any suitable acid such as $H_2SO_4$. The solution then undergoes precipitation which produces an aluminum phosphate precipitate and a concentrated and highly pure chromate solution which is then isolated by standard solid/liquid separation means. Typically, the chromate solution has the following composition:

| Elements | Cr | Al | Fe | P | Ca | Mg | Na | Zn |
|---|---|---|---|---|---|---|---|---|
| Conc., gpl | 30-100 | <0.05 | <0.1 | <0.02 | <0.1 | <0.1 | 30-150 | <0.02 |

The highly pure chromate solution produced by the present invention is suitable for the manufacture of metallic chromium or a variety of chromium chemicals, such as the manufacture of chromic acid, pure $Cr_2O_3$ and various chromate salts. The chromate solution may also be subjected to additional treatments, such as acidification, crystallization, reduction, precipitation with lead or barium, prior to its marketing to chromium chemical producers.

The residue of the water leach of the calcined admixture (normally unwashed) may be recycled to the acid dissolution step as shown in FIG. 1 to enhance chromium and aluminum recovery and to utilize some retained soluble chromates in this residue for oxidizing purposes in this processing step.

The precipitated solids in the aluminum:phosphorous and pH adjustment step may be advantageously recycled into the chromium precipitation step to enhance aluminum recovery as shown in FIG. 1.

After the chromium is removed from the chromium-aluminum solution (preferably in the form of chromium hydroxide), aluminum can be recovered from the remaining alkaline aluminate solution by several means. Advantageously to achieve maximum utilization of reagents, aluminum is recovered by precipitating alumina trihydrate in autoseeded crystallization. As a result of precipitating alumina trihydrate, a caustic reagent (NaOH or KOH) is regenerated which can be reused in the chromium precipitation step. The alkaline aluminate can also be conveniently coprocessed with similar streams in facilities established for recovery of aluminum chemicals, especially alumina trihydrate.

The invention is further illustrated in the examples which follow. These examples are set forth to aid in an understanding of the invention and are not intended to, and should not be construed to, limit in any way the invention as set forth in the claims which follow thereafter.

EXAMPLE I 500 gms of wet chromium-aluminum sludge analyzing 76.1% moisture and on dry basis 6.1% Cr, 8.7% Al, 0.7% Fe, 10.6% Ca, 1.6% Mg, 2.0% Na, 1.6% Mg, 0.01% Zn, 8.0% P was slurried in 1000 ml with $H_2O$, (119.5 gpl solids dry basis). Enough, 98%, sulfuric acid was added to achieve a pH of 1.2 and substantially dissolve all chromium and aluminum at a slightly elevated temperature, 95°-110° F. (generated by the reaction and dilution of sulfuric acid).

The slurry, without raising the pH, is filtered and the solid residue washed on the filter with 100 ml of water.

The residue, after drying, weighed 47.3 gms and analyzed 0.9% Cr, 0.8% Al, 22.9% Ca indicating 92.5% Cr and 96.4% Al recovery in the leach solution. This residue (39.5% of the original waste on dry basis) is further tested as described in Example V to render it non-hazardous and suitable for disposal or further processing.

The resulting chromium-aluminum leach solution analyzed as follows:

| Elements | Cr | Al | Fe | Ca | Mg | P |
|---|---|---|---|---|---|---|
| Conc., gpl | 8.37 | 10.6 | 0.86 | 0.6 | 1.6 | 9.8 |

The solution is treated with a 50% NaOH solution to raise the pH to 12.2 at ambient temperature to completely precipitate chromium as chromium hydroxide and retain the aluminum in the solution as soluble alkaline aluminate.

This solution was further processed for aluminum recovery as explained in Example V.

The wet unwashed chromium hydroxide (10.1% Cr, 2.2% Al, 0.7% Ca, 1.0% Fe, 5% P on dry basis) was enriched with NaOH by slurrying it in 200 gpl NaOH and filtering of the excess NaOH solution. This enrichment process could be achieved by precipitating chromium at a higher pH level or by mixing other alkalies or earth alkalies with the wet chromium hydroxide.

The chromium hydroxide cake enriched with NaOH was calcined in a tube furnace at 1200.F for 2 hours in flowing air. The calcined material was crushed to avoid big pieces and then leached in 200 ml of water at ambient temperature for 2 hours. The sodium chromate solution was filtered off, and the residual solids were washed with 20 ml of water. The cake weighed 24.4 gms, analyzed 1.7% Cr and 0.76% Al. This cake is preferably recycled into the acid dissolution step to maximize chromium recovery and to reduce soluble chromate values, while oxidizing ferrous or sulfite content in the feed waste material.

The chromate solution which had a pH of 12 and contained 7.8 gpl Al and 4.3 gpl P was spiked with 2 gpl Al from a concentrated aluminum solution and the pH was adjusted to pH 7.5 with $H_2SO_4$. The precipitated aluminum phosphate was filtered off. It weighed 4.4 gms and analyzed 1.5% Cr, 20.2% Al, 7.9% P. These solids were recycled to the chromium precipitation step to enhance aluminum recovery through an internal processing recycle.

The final product chromate solution (220 ml) analyzed:

| Elements | Cr | Al | Fe | Ca | Mg | Zn | P | Na |
|---|---|---|---|---|---|---|---|---|
| Conc., gpl | 31.0 | <0.01 | <0.1 | <0.01 | <0.1 | <0.1 | 0.03 | 46 |

The process yielded a 10% $Na_2CrO_4.2\ H_2O$ solution which is suitable for industrial uses. Total chromium recovery, not calculating enhanced recovery through internal recycling, is estimated for this case to be about 88.0%.

EXAMPLE II

This example illustrates a simpler practice of the invention with a waste material having a higher iron content which reduces the number of processing steps in generating the high purity chromate solution with a low phosphorous content.

The wet feed material analyzed 69% moisture, and on dry basis, 6.8% Cr, 9.4% Al, 7.3% Ca, 3.8% Fe, 6.5% P. The material was processed similarly as that of Example I and the chromium hydroxide obtained analyzed on a dry basis as: 19.4% Cr, 2.3% Al, 2.5% Ca, 6.7% Fe, 1.0% P, 1.6% Mg, 0.8% Zn, thus having a favorable Fe/P ratio. The wet cake was enriched with NaOH as in Example I and then calcined at 1200° F. for 2 hrs. in flowing air. Twenty grams of the calcined material (analyzing 18.7% Cr) was leached in 60 ml $H_2O$ at ambient temperature for 2 hrs. and the pH of the slurry was adjusted to pH 6.5 at the end of leaching.

The product chromate solution was of satisfactory purity and analyzed: 62.2 gpl Cr, 0.8 gpl Ca, 0.15 gpl Mg, less than 0.01 gpl of Al, Fe, P, Zn. Chromium recovery into the chromate solution from chromium hydroxide was >93.0%.

In comparison with Example I, processing of this material did not require aluminum ion addition to control phosphorous and required one filtration and one processing step less than in Example I or as illustrated in FIG. 1.

EXAMPLE III

This example and example IV illustrate how the pH adjustment step and the mode of water leach can influence the purity and strength of the final chromate solution product. In this test series, chromium hydroxide (as in Example I) was slurred in a 200 gpl NaOH solution, filtered and then roasted at 1200° F. for 2 hours. This calcined material was leached in water at 20 gms dry wt. solids in 60 ml volume. Four tests were run: (Test 1) pH maintained as is—only water added to the calcined material; (Test 2) pH adjusted to 6.5 prior to filtration but after the 2 hour leaching; (Test 3) pH of 6.5 maintained during leaching and filtration; (Test 4) pH maintained as is during leaching and filtration, solids are then removed and the pH is adjusted to 6.5 in the solution prior to precipitation. The results are tabulated below:

| Test No. | Conditions | Leach pH | pH Prior to Filtration | Cr gpl | Al gpl | P gpl | Fe gpl | Ca gpl | Mg gpl |
| --- | --- | --- | --- | --- | --- | --- | --- | --- | --- |
| 1 | pH "As Is" | 12 | 12 | 63 | 4.1 | 0.50 | <.01 | 0.03 | <.01 |
| 2 | pH Adjusted After Leach | 12 | 6.5 | 62 | <.01 | 0.01 | <.01 | 0.82 | 0.15 |
| 3 | pH Maintained | 6.5 | 6.5 | 65 | <.01 | 0.02 | <.01 | 1.20 | 1.3 |
| 4 | Solids Removed | 12 | 12/6.5 | 48 | <.01 | 0.01 | <.01 | 0.02 | <.01 |

*V, Ni, Co, Cd, Cu, Si, Zn and W were all <0.01 gpl.

As the above table shows, neutralization of the slurry pH prior to filtration, rejects virtually all aluminum and phosphorous from the chromate solution to the solid residue. Removal of the solids prior to pH neutralization prevents solubilization of calcium and magnesium into the chromate product solution.

EXAMPLE IV

In this example, the chromium hydroxide (as in Example I) was slurried in a 200 gpl NaOH solution, filtered and roasted at 1200° F. for 2 hours. The calcined material was leached in water at 20 gms dry wt. solids in various volumes: 20, 30, 40, 60, 80 and 100 ml. A temperature of 120° F. and 2 hours retention was employed during leaching. The slurries were adjusted to pH 6.5 before filtration.

Assays of the chromate products solution are shown below:

| Solids Conc. gpl | Cr gpl | Fe gpl | P gpl | Ca gpl | Mg gpl | Na gpl |
| --- | --- | --- | --- | --- | --- | --- |
| 200 | 23 | <.01 | 0.01 | 0.33 | 0.10 | 27 |
| 250 | 50 | <.01 | <.01 | 1.30 | 1.20 | 50 |
| 333 | 65 | <.01 | 0.02 | 1.20 | 1.30 | 73 |
| 500 | 100 | <.01 | 0.02 | 1.40 | 1.70 | 105 |
| 666 | 130* | <.01 | 0.05 | 1.04 | 1.93 | 116 |
| 1000 | 160* | <.01 | 0.08 | 0.29 | 1.91 | 133 |

*The filtrates crystallized and the crystals were mainly $Na_2SO_4$.
V, Al, Ni, Co, Cd, Cu, Si, W and Zn were all <0.01 gpl.

The above table shows that very concentrated solutions can be prepared without evaporation. Solutions with chromium levels between 100 and 150 gpl Cr at room temperature can be achieved, which is equivalent to the commercial 30 to 45% $Na_2CrO_4.2 H_2O$ solutions.

EXAMPLE V

This example illustrates coprocessing of the solid residuals and aluminate solutions (generated from processing waste material according to the present invention) in facilities established to recover aluminum from spent catalyst (Mo, V, $Al_2O_3$) generated by the oil refining industry. A typically spent catalyst contains by weight: 4–6% Mo, 2.5% V, 35–40% $Al_2O_3$, 2.5% (Ni+Co), 6–10% S and minor amounts of residuals.

The solids residue (predominantly calcium, iron and phosphorous) generated in the acid dissolution step and the residue generated in the water leach of the calcined material, as described in Example I, was further processed with the alumina based spent catalyst from the oil refining industry in the ratio of 1:9.

The mixed feed was leached under pressure at 380° F. for 2 hours with a caustic solution of 200 gpl NaOH containing some aluminate solution.

The alumina extraction from the mixture was 85% and the chromium concentration in the leach solution was less than 1.0 ppm. The undissolved residue of this high temperature leaching contained chromium but in a fixed form which passed the EPA test as non-hazardous material. The residue yield less than 0.5 ppm Cr in the EPA test leachate, far below the limit of 5 ppm Cr.

From the aluminate solution, aluminum trihydrate product was recovered containing 64.5% $Al_2O_3$ and less than 0.01% Cr.

The EPA chemical activity test employed in the foregoing examples is disclosed in the government publication entitled "EPA Test Methods for Evaluation Solid Waste", Office of Solid Waste and Emergency Response, Washington, D.C. 20460, November 1986, SW-846 (Third Edition). Reference is made to Chapter Seven, in particular, the sub-heading entitled 7.4 Extraction Procedure Toxicity.

Although the present invention has been described in conjunction with the preferred embodiments, it is to be understood that modifications and variations, which will become apparent to those skilled in the art upon reading the present disclosure, are considered to be within the spirit and scope of the invention.

What is claimed is:

1. A process for recovering chromium as a chromate solution from a chromium-containing waste material, the process comprises:
   a) treating the waste material so as to produce a slurry;
   b) Reading the clurry with our acid under suitable conditions to dissolve at least about 85% chromium in the waste material and to produce a solids residue and a chromium solution;
   c) separating the solids residue and the chromium solution;
   d) treating the chromium solution to recover a solid chromium compound and produce a chromium-free solution;
   e) isolating the solid chromium compound from the chromium-free solution;
   f) mixing the solid chromium compound with an alkali or alkaline earth to form an admixture;
   g) calcining the admixture of to convert at least about 88% of the chromium compound to a chromate
   h) leaching the calcine admixture to form a chromate solution and a leach residue; and
   i) isolating the chromate solution.

2. A process of claim 1, wherein the waste material is a spent etchant solution comprising chromium, aluminum, calcium, iron and phosphorous or compounds thereof.

3. A process of claim 1, wherein treating the waste material of step (a) comprises mixing the waste material with water.

4. A process of claim 3, wherein the mixing is performed at a temperature from about ambient to about 210° F. and the slurry has a specific gravity from about 1.02 to about 1.35.

5. A process of claim 1, wherein the acid is reacted with the slurry at a pH in the range from about 0.1 to about 3.0.

6. A process of claim 5, wherein the pH is the range from about 1.0 to about 1.5.

7. A process of claim 1, wherein the acid is $H_2SO_4$, HCl, or $HNO_3$.

8. A process of claim 7, wherein the acid is $H_2SO_4$.

9. A process of claim 1, wherein the acid is reacted with the slurry at a temperature in the range from ambient temperature to about 150° F.

10. A process of claim 1, wherein an oxygen-containing gas is mixed with the slurry and acid during the reaction of step (b).

11. A process of claim 1 which further comprises adjusting the pH of the chromium solution of step (b) to a pH in the range of about 1.2 to 3.5.

12. A process of claim 11, wherein the pH of the chromium solution is adjusted to a pH in the range of about 1.4–2.0.

13. A process of claim 11, wherein the pH of the chromium solution is adjusted by the addition of an alkaline reagent.

14. A process of claim 13, wherein the alkaline reagent is lime or hydrated lime.

15. A process of claim 1, wherein the treatment of the chromium solution of step (d) comprises pH precipitation of the chromium compound.

16. A process of claim 15, wherein an alkaline hydroxide is added to the chromium solution, pH precipitation is conducted at a pH in the range of about 11.5 to 13.8, and the chromium compound recovered is chromium hydroxide.

17. A process of claim 16, wherein the pH precipitation is conducted at a pH in the range of about 12.0 to 12.5.

18. A process of claim 16, wherein the alkaline hydroxide is sodium hydroxide.

19. A process of claim 1, wherein the alkali or earth alkali of step (f) is selected from the group consisting of NaOH, KOH, $Na_2CO_3$, CaO, $Ca(OH)_2$, $CaCO_3$, and combinations thereof.

20. A process of claim 1, wherein the alkali to chromium weight ratio of the admixture of step (f) is about 1.0 to about 2.0.

21. A process of claim 20, wherein the weight ratio is about 1.2 to about 1.5.

22. A process of claim 1, wherein the calcining of the admixture in step (g) is performed in an oxidizing atmosphere at a temperature in the range of about 1000° to 2000° F.

23. A process of claim 22, wherein the calcining is performed at a temperature in the range of about 1200°–1600° F.

24. A process of claim 1, wherein the leaching of the calcined admixture in step (h) is conducted in water.

25. A process of claim 24, which further comprises adjusting the aluminum:phosphate ratio of the chromate solution to a ratio in the range of about 1:1 to 2:1 and adjusting the pH to a pH of about 6 to 8.

26. A process of claim 1, which further comprises recycling the leach residue from step (h) to the slurry of step (b).

27. A process of claim 1, wherein the waste material comprises a aluminum or an aluminum compound and wherein the aluminum or aluminum compound is dissolved by the acid by step (b) and is contained in the chromium solution of step (b).

28. A process of claim 27, wherein the chromium-free solution of step (d) comprises aluminum or an aluminum compound.

29. A process of claim 28 which further comprises treating the chromium-free solution of step (e) to recover aluminum or an aluminum compound.

30. A process of claim 29, wherein the aluminum compound is alumina trihydrate.

* * * * *